United States Patent
Chang et al.

(10) Patent No.: US 11,990,292 B2
(45) Date of Patent: May 21, 2024

(54) BUTTON MECHANISM WITH STABILIZING DOME

(71) Applicant: Apple Inc., Cupertino, CA (US)

(72) Inventors: Yu-Po Chang, Shanghai (CN); Chia Chi Wu, Taipei (TW)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/934,321

(22) Filed: Sep. 22, 2022

(65) Prior Publication Data

US 2024/0105400 A1    Mar. 28, 2024

(51) Int. Cl.
  *H01H 13/14*  (2006.01)
  *G06F 1/16*  (2006.01)
  *H01H 13/20*  (2006.01)

(52) U.S. Cl.
  CPC .......... *H01H 13/14* (2013.01); *G06F 1/1662* (2013.01); *H01H 13/20* (2013.01); *H01H 2215/004* (2013.01)

(58) Field of Classification Search
  CPC .. H01H 13/14; H01H 13/20; H01H 2215/004; H01H 13/70; H01H 13/7073; H01H 3/12; H01H 2215/006; H01H 2215/012; H01H 2215/016; H01H 2215/018; H01H 2215/026; H01H 2221/044; H01H 2227/022; G06F 1/1662; G06F 1/16
  See application file for complete search history.

(56) References Cited

U.S. PATENT DOCUMENTS

| | | | | |
|---|---|---|---|---|
| 7,960,663 | B2 * | 6/2011 | Yoshihiro | H01H 13/83 200/313 |
| 8,212,160 | B2 * | 7/2012 | Tsao | H01H 13/64 200/1 B |
| 8,497,441 | B2 * | 7/2013 | Yoshihiro | H01H 13/83 200/314 |
| 2011/0000775 | A1 * | 1/2011 | Itou | H01H 13/705 200/520 |
| 2011/0011715 | A1 * | 1/2011 | Itou | H01H 13/705 200/341 |

* cited by examiner

*Primary Examiner* — Lheiren Mae A Caroc
(74) *Attorney, Agent, or Firm* — Dorsey & Whitney LLP

(57) ABSTRACT

A computing device can include a housing defining an opening, a base layer, and a button mechanism positioned in the opening. The button mechanism can include a keycap movable relative to the base layer between an undepressed state and a depressed state, and a dome contacting the keycap, the dome including a first surface and a second surface, opposite the first surface. In the undepressed state, the first surface can be concave and the second surface can be convex. In a partially depressed state, a first portion of the first surface can be convex and a second portion of the first surface can be concave. In the depressed state, the first surface can be convex and the second surface can be concave.

20 Claims, 6 Drawing Sheets

BUTTON MECHANISM WITH STABILIZING DOME

FIELD

The disclosure relates generally to a switch assembly for an electronic device and, more particularly, to a switch assembly having a dome that acts as a parallel motion mechanism.

BACKGROUND

Electronic devices typically include one or more input devices such as keyboards, touchpads, mice, or touchscreens to enable a user to interact with the device. These input devices can be integrated into an electronic device or can stand alone as discrete devices that can transmit signals to another device or to a processor via wired or wireless connection. For example, a keyboard can be integrated into the casing or housing of a laptop computer, and can transmit signals or otherwise provide inputs to a processor of the laptop computer.

Keyboards typically include multiple individual keys. Each individual key may include multiple components, such as a keycap or other input surface for receiving physical input from a user, mechanisms for supporting the keycap, and electrical components that allow the electronic device to detect when a key has been pressed. There is a constant need for improvements and refinements to keyboards and related input mechanisms.

SUMMARY

According to some aspects of the present disclosure, a computing device can include a housing defining an opening, a base layer, and a button mechanism positioned in the opening. The button mechanism can include a keycap movable relative to the base layer between an undepressed state and a depressed state, and a dome contacting the keycap, the dome including a first surface and a second surface, opposite the first surface. In the undepressed state, the first surface can be concave and the second surface can be convex. In a partially depressed state, a first portion of the first surface can be convex and a second portion of the first surface can be concave. In the depressed state, the first surface can be convex and the second surface can be concave.

In some examples, the computing device can include a protrusion, the dome pressable into the protrusion as the keycap moves between the undepressed state and the depressed state. The protrusion can define a ring-like shape. The dome can include a metal material. The dome can be biased to be concave at the first surface. The dome can be collapsible in response to a rotation of the dome.

In some examples, in the partially depressed state, the keycap can be tilted. The dome can include a set of corners, wherein the computing device includes a ridge positioned beneath each corner of the set of corners of the dome.

The dome can transfer a force from a first end of the keycap to a second end of the keycap, the second end being opposite the first end. The dome can include a step that buckles to collapse the dome.

According to some aspects, a key can include an input member operative to move from a first position to a second position, a collapsible stabilizer supporting the input member, a baseplate supporting the collapsible stabilizer, the baseplate defining a ridge. In response to an off-center portion of the collapsible stabilizer being pressed against the ridge, the collapsible stabilizer can invert.

In some examples, the baseplate can include multiple ridges, each ridge corresponding to a corner of the input member. The collapsible stabilizer can provide a tactile feedback in response to collapsing. The collapsible stabilizer can equalize a motion of the input member. The key can include a sound dampening layer.

According to some aspects, a key mechanism can include a keycap movable between a first position to a second position, a spring including a first end and a second end, the second end being opposite the first end, the first end and the second end being biased in a first direction, and a fulcrum engageable with the spring, the fulcrum being offset from a center of the spring. In response to the first end pivoting about the fulcrum, the second end is biased in a second direction, the second direction being opposite the first direction.

In some examples, the spring can be attached to the keycap. In response to movement of the first end of the spring in the second direction, the spring can pull the second end of the keycap in the second direction. The key mechanism can define an electrical contact movable through an aperture defined by the spring. The spring can be bi-stable.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
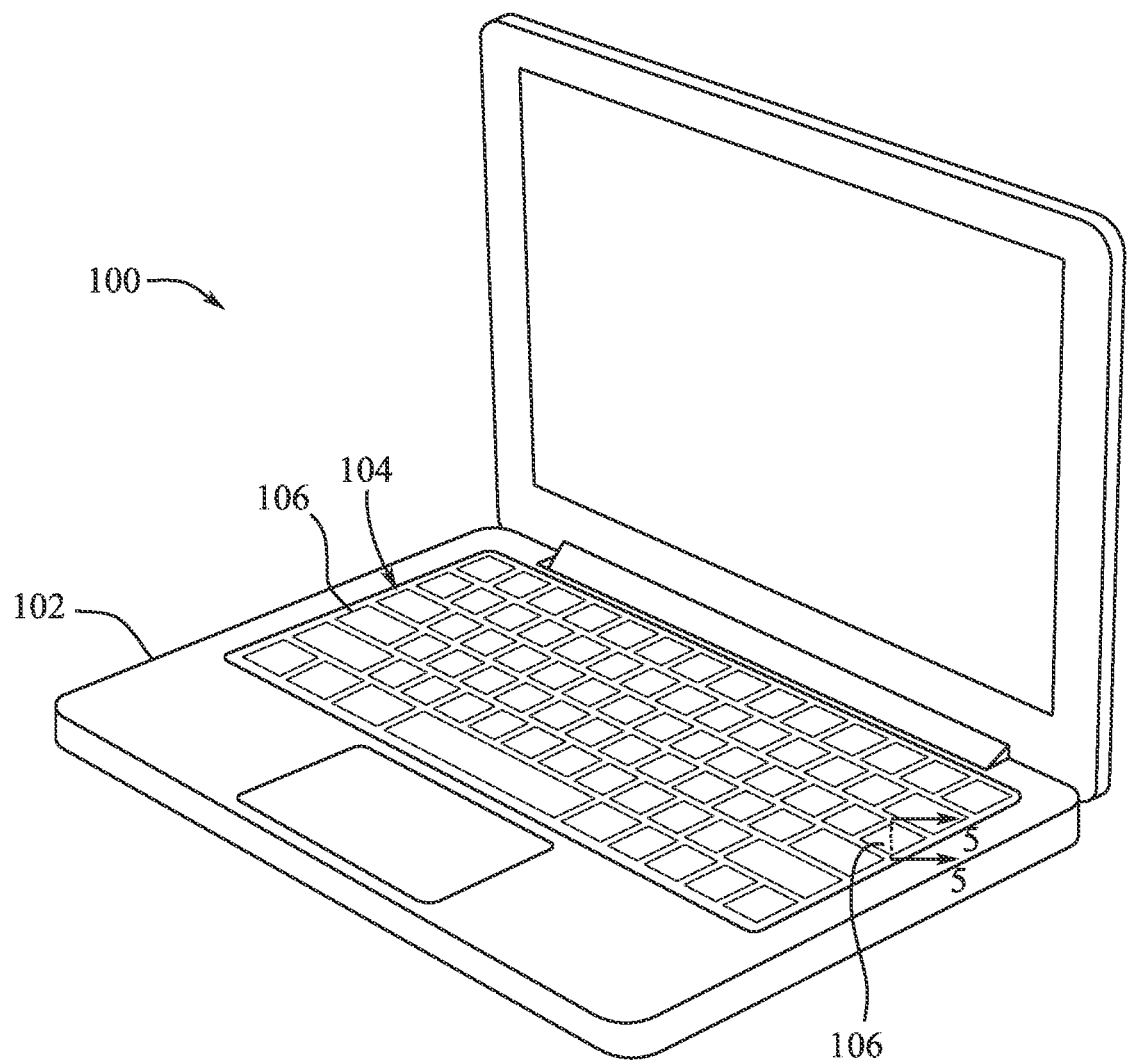
FIG. 1 shows a perspective view of a computing device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to switch assemblies, also referred to as button mechanisms. More particularly, the following disclosure relates to switch assemblies that include a dome that transfers a force from one end of the dome to another, opposite end of the dome.

In some examples, the dome acts as a force transfer mechanism. In some examples, the dome acts as a key stabilizer. The dome can be referred to as a collapsible stabilizer or spring. As used herein, the term "stabilizer" can refer to a component that provides uniform motion of the keycap, prevents tilting of the keycap, transfers forces in the keycap, equalizes motion of the keycap, and/or enables parallel motion of the keycap, especially in situations where the keycap is pressed off-center and would otherwise have a tendency to tilt or rotate one end lower than the opposite end thereof. In some examples, the dome acts as a parallel motion mechanism that enables the keycap to keep its major surface substantially parallel with a frame or baseplate during a keypress, even a keypress made to (or near to) a corner or edge of the keycap. Such switch assemblies may be used in input mechanisms such as keyboard keys, buttons, or the like and are able to achieve thinner and lighter keyboards that are less expensive to build and that require fewer parts.

In some embodiments, the switch assembly includes a stop or protrusion attached to or extending from a baseplate. The stop can be positioned such that the dome contacts the stop when being pressed downward. The stop can act as a fulcrum or pivot point about which the dome bends, rotates, pivots, or collapses. In some examples, the stop can extend from a bottom of the dome and can be positioned to contact the baseplate. The button mechanisms described herein advantageously have a reduced thickness and reduced complexity by removing the need for a separate stabilizer or parallel motion mechanism (e.g., a scissor mechanism or butterfly mechanism). The button mechanisms described herein can have a thin architecture with approximately a 2.35-millimeter stackup depth and a key stroke of approximately 0.75 millimeters.

Although structures, operations, and methods of manufacture are described herein with respect to a key of a keyboard, it should be appreciated that the instant disclosure is equally applicable to other input devices. Thus, mice, input buttons, trackpads, and the like may also incorporate the concepts described herein. The foregoing and other embodiments are discussed below with reference to FIGS. 1-6. However, those skilled in the art will readily appreciate that the detailed description given herein with respect to these figures is for explanatory purposes only and should not be construed as limiting.

Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 depicts an example electronic device 100 including a keyboard assembly 104, according to embodiments of the present disclosure. In a non-limiting example, the electronic device 100 may be a laptop computer, though other devices are also contemplated (e.g., desktop or tablet computers, peripheral input devices (e.g., desktop keyboards), kiosks, point of sale registers, control boards, macro pads, numpads, calculators, etc.). The device 100 may incorporate a keyboard 104 that includes a set of button mechanisms 106 that include a stabilizing dome, as described herein.

The electronic device 100 may include a top case 102. The top case 102 may take the form of an exterior, protective casing, shell, housing, frame, or web for the electronic device 100 and the various internal components (for example, the keyboard assembly 104) of the electronic device 100. The top case 102 may be formed as a single, integral component or may have a group of distinct components configured to be coupled to one another. Additionally, the top case 102 may be formed from any suitable material that provides a protective casing or shell for the electronic device 100 and the various components included in the electronic device 100. In non-limiting examples, the top case 102 may be made from metal, a ceramic, a rigid plastic or another polymer, a fiber-matrix composite, and so on. In some embodiments, the top case 102 can include a first portion acting as a structural support or shell and a second portion extending between the keys of the keyboard assembly 104 and acting as a key web or key mechanism support.

Keycaps or other portions of the button mechanisms 106 may partially protrude from the top case 102 and each may be substantially surrounded by a portion of the top case 102 (e.g., a web or frame portion of the top case 102). That is, the button mechanisms 106 of the keyboard assembly 104 may extend beyond (e.g., above) a surface of the top case 102 and may be divided or separated by a portion of top case 102.

In the non-limiting example shown in FIG. 1, where the electronic device 100 is a laptop computer, the keyboard assembly 104 may be positioned within and/or may be received by the electronic device 100. In an additional embodiment, the keyboard assembly 104 may be a separate and distinct freestanding component and may be in electronic communication (for example, via wired or wireless communications techniques) with the electronic device 100 or a different electronic device such as a tablet or desktop computer.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1. Example structures of an individual key are discussed in more detail below with respect to FIGS. 2-6.

Figure 2:
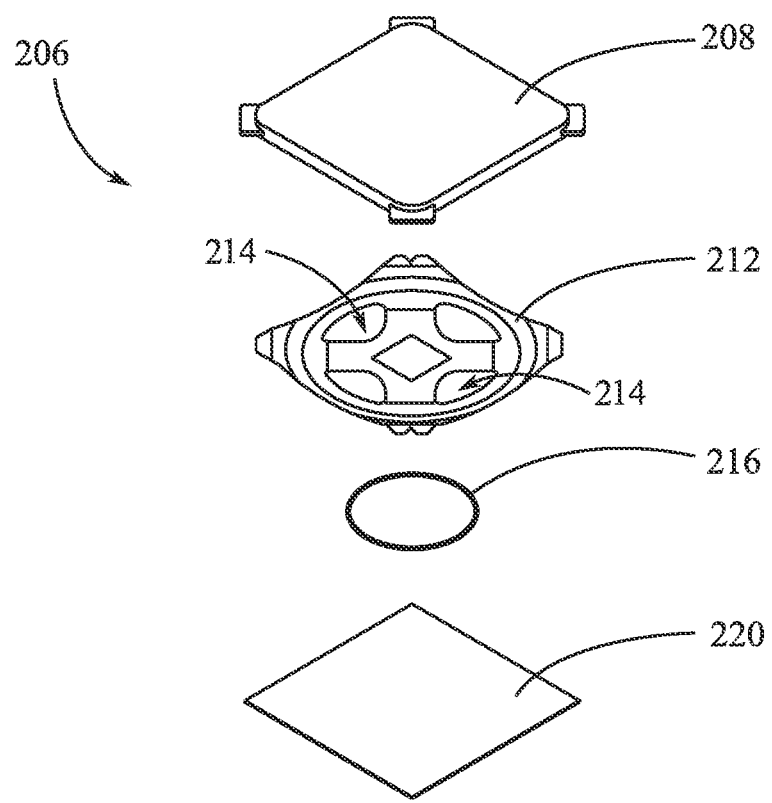
FIG. 2 shows a perspective exploded view of a button mechanism.

FIG. 2 shows a perspective exploded view of a button mechanism 206. The button mechanism 206 can be positioned in a device, such as device 100. The button mechanism 206 can include a keycap 208 (i.e., a button cap or input member), a dome 212, a stop 216, and a substrate 220. The substrate 220 (also referred to as a base layer or baseplate) can be a printed circuit board having an electrical contact. In some examples, the keycap 208 is not coupled to a hinge, scissor mechanism, or other vertical biasing mechanism or stabilizer aside from the dome 212. In other words, the keycap 208 can be supported by the dome 212 and stop 216 and can be biased upward (i.e., away from the substrate 220) without any other additional supports or hinged mechanisms linking the keycap 208 to the substrate 220. Upward motion of the keycap 208 can be limited by contact between the periphery of the keycap 208 and the top case 102, such as contact between a top surface of the keycap 208 and a bottom surface of the top case 102. Although the keycap 208 is illustrated as being approximately square, it will be appreciated that the button mechanism 206 can also be successfully implemented, and is contemplated for use, with an elongated keycap. In such examples, the dome 212 can likewise be elongated and rectangular. Furthermore, in some embodiments, for an elongated keycap, the dome can have its square shape and an additional stabilizer or other support can be used to keep the top of the keycap substantially perpendicular to the direction of travel (i.e., keep the keycap parallel to a horizontal plane), even when only one corner or peripheral side of the keycap is pressed.

The dome 212 can be metal. The metal used to construct the dome 212 can be selected based on its ability to be thin while having a sufficiently high Young's modulus. For example, the dome 212 can be about 0.05 mm thick, yet still be able to elastically deform and return in response to a key press. The dome 212 may allow the keycap 208 to be moved from an undepressed state to a depressed state in response to an actuation force applied to the top surface of the keycap 208.

As discussed in greater detail below, the dome 212 may be positioned below the keycap 208 such that depression of the keycap 208 subsequently deflects the dome 212. Simultaneously, that movement can close a switch or use a portion of the dome 212 to complete an electrical connection or path, thereby triggering a "key make" or generate an electrical signal. An electronic device (e.g., the electronic device 100) may detect the completion of the electrical connection or path and register a key input based upon the detection.

As shown in FIG. 2, the button mechanism 206 can include a stop 216. The stop 216 can also be referred to as a pusher, a ring, a pusher ring, a protrusion, a ridge, or a fulcrum. The stop 216 can be a separate component that is positioned between the dome 212 and the substrate 220. The stop 216 can be attached to the substrate 220. The stop 216 can also be a unitary or integral component with the substrate 220. In some examples, the stop 216 is attached to the dome 212. The stop 216 can be integrally formed from the dome 212.

The stop 216 can be circular through a cross-section and define a ring-like or torus shape. In some examples, the size, shape, and position of the stop can depend on, or be proportional to the size, shape, and position of the dome 212. For example, as shown in FIG. 2, the center of the stop 216 ring can be coaxially aligned with a center of the dome 212 and/or keycap 208. However, as is described in greater detail below, in some examples, the stop can comprise a set of protrusions that are offset from a center of the dome 212. More specifically, the button mechanism 206 can include multiple stops that are offset from a central axis of the dome 212.

The dome 212 and the stop 216 can press against one another when the keycap 208 is depressed. Specifically, the dome 212 can move downward to contact or press against the stop 216. Accordingly, the stop 216 may impart a counter force on the dome 212 (i.e., it may push back), which causes the dome 212 to buckle, bend, or collapse. The interaction between the dome 212 and the stop 216 can more evenly distribute the force applied to the keycap 208 (e.g., when the keycap 208 is tilted by being pressed on an edge or a corner). By transferring the force through the dome 212, an off-center press can still cause collapse of the entire dome 216, which in turn causes a substantially parallel/uniform motion of the keycap 208. Causing a substantially parallel or uniform motion of the keycap 208 can be referred to as "equalizing" motion of the keycap 208. Equalizing motion of the keycap 208 can include correcting for a tilt or non-parallel motion in the keycap 208, to provide parallel motion or full collapse of the keycap 208.

The dome 212 may be attached to the keycap 208, such as by being attached to the keycap at each corner of the dome 212. In some examples, the dome 212 is constrained by the keycap 208 so that the dome 212 must be bent or flexed in a certain way to enable withdrawal of tabs on the dome 212 from receiving recesses on the keycap 208. Thus, the dome 212 may be substantially secured or retained to prevent or limit the dome 212 from moving in an undesired direction (e.g., horizontally or perpendicular to the direction of depression). In some examples, the dome 212 can define one or more holes or apertures 214. The holes 214 in the dome 212 can be positioned and shaped to promote buckling of the dome in a certain manner. The holes can decrease a stiffness and increase a flexibility of the dome 212. As described below, the hole(s) can enable contact between a conductive component on the keycap 208 and substrate 220. The holes or apertures 214 can cause the dome 212 to have a substantially cross-shaped central bridge portion with crossing portions that are oriented along diagonal axes extending between the corners of the dome 212.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3A:
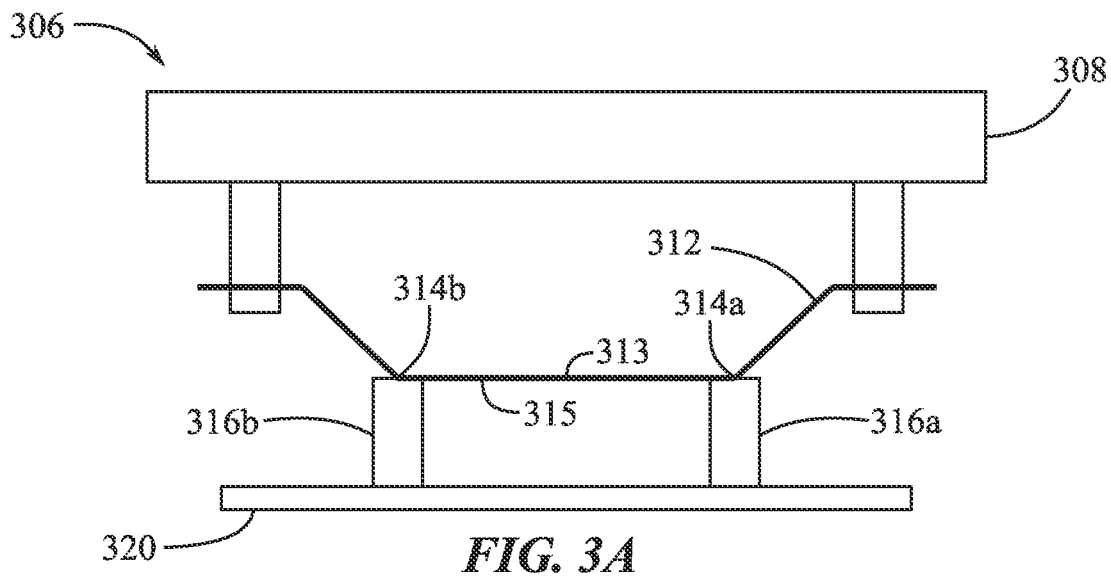
FIG. 3A shows a side view of a button mechanism in an undepressed state.

FIG. 3A shows a schematic side view of a button mechanism 306 in an undepressed or rest state. It will be understood that for simplicity only select component or features of the button mechanism 306 are shown. The depiction of FIG. 3A is not intended to be exhaustive. The button mechanism 306 can be substantially similar to, including some or all of the features of, the button mechanisms described herein, such as button mechanisms 106 and 206.

The button mechanism 306 can include a keycap 308, a dome 312, stops 316a, 316b (collectively referred to as stops 316), and a substrate 320. As shown in FIG. 3A, in a natural or rest state when the keycap 308 is not pressed (i.e., an undepressed state), the keycap 308 can be substantially parallel with the substrate 320. The dome 312 can include a first surface 313 (i.e., a top surface or keycap-facing surface) and a second surface 315 (i.e., a bottom surface, base-facing surface, or substrate-facing surface). The first surface 313 and the second surface 315 can be major surfaces of the dome 312 and can be opposite one another. In some examples, the first surface 313 can be referred to as an upper surface. The second surface 315 can be referred to as a lower surface of the dome 312.

The stops 316 can be separate, distinct components, or can be a unitary component, such as a ring-shaped stop (e.g., 216). As shown in FIG. 3A, in an undepressed state, the dome 312 can be curved such that the first surface 313 of the dome 312 is predominantly concave, and the second surface 315 of the dome 312 is predominantly convex. In some examples, the second surface 315 of the dome 312 directly contacts, touches, or rests on the stops 316. The dome 312 and keycap 308 can be supported, partially or entirely, by the stop 316. In other words, the weight of the keycap 308 and the dome 312 can rest on the stop 316. In some embodiments, one or more portions of the dome 312 can be bottom-supported by contact with the substrate 320 and may or may not contact the stops 316 in that state.

The dome 312 can include one or more steps 314a, 314b (collectively referred to as steps 314). The steps 314 can be breaks, joints, elbows, reliefs, or any other dome shape feature that collapses, bends, snaps or otherwise pivots in response to pressure applied to the dome by one or more stops 316. In some embodiments, the pressure against the step(s) 314 can invert a region of the dome 312. In some examples, the steps 314 can be specifically designed to have a lower strength or stability threshold on the dome 312 such that the location of the steps 314 are the first to deform in response to a force on the keycap 308.

Figure 3B:
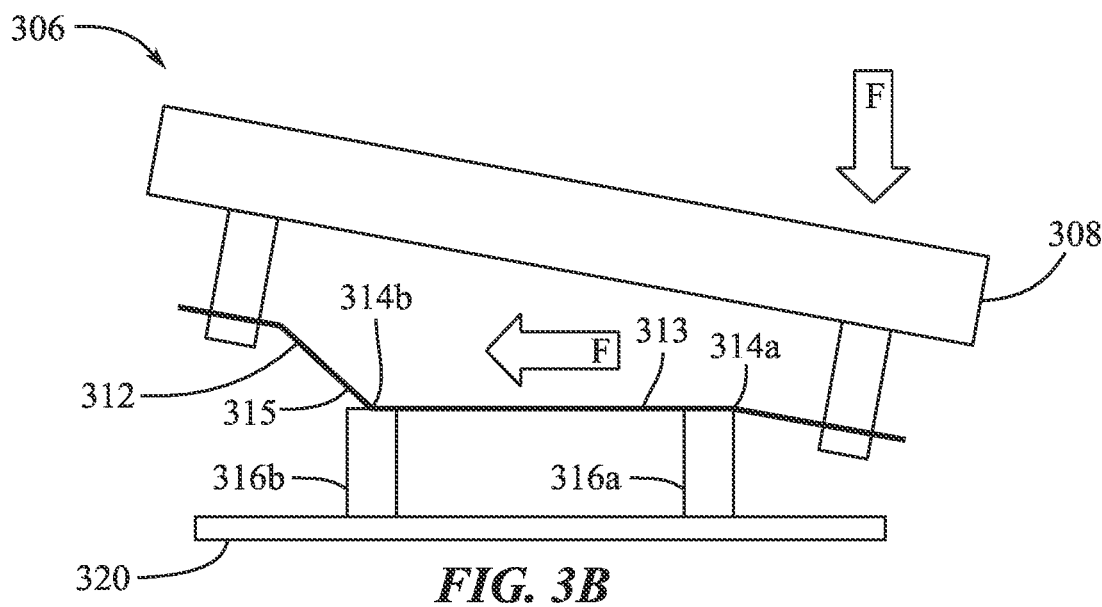
FIG. 3B shows a side view of the button mechanism of FIG. 3A in a partially depressed state.

FIG. 3B shows a side view of the button mechanism 306 in a tilted or partially depressed state. The tilt or rotation of the keycap 308 shown in FIG. 3B can be caused by a force F applied to a peripheral edge or corner of the keycap 308. As the off-center force F is applied, pressure against the dome 312 against the stop 316a increases relative to pressure at stop 316b, thereby causing the step 314a to buckle, flatten, and invert. In other words, the first surface 313 at step 314a can transition from being concave to being flat or convex. In response to the off-center force F, the dome 312 can partially deform or deflect. As illustrated, the dome 312 can deform such that a portion of the dome inverts while a different portion of the dome 312 is less affected and uncollapsed. In other words, in response to the force F being applied to an edge or corner of the keycap 308, a portion of the first surface 313 bends to be convex. Thus, in a partially depressed state, the first surface 313 of the dome 312 can be partially concave and partially convex. Likewise, the second surface 315 can be partially concave (at 314a) and partially convex (at 314b) during an off-center key press. Collapse of the step 314a can generate a wave or cascading buckle (i.e., a force or motion wave) in the dome 312 which propagates across the dome 312 away from the side of the dome contacting the stop 316a and which causes the step 314b to collapse, thereby drawing the opposite side of the keycap 308 downward as well. See FIG. 3C.

In some examples, the angle of the steps 314 can determine the necessary force to collapse the dome 312. For example, the more angled the steps 314 the more force is necessary to cause the steps 314 to buckle. Likewise, the flatter the steps 314 the less force is needed to invert the steps 314. Furthermore, the steps 314 need not be angular (i.e., with relatively straight cross-sections that come together at each step 314) and can instead have smoothly curved cross-sections. In some embodiments, the dome 312 can have a smoothly curved cross-section extending from one keycap-attached end of the dome 312 to an opposite keycap-attached end thereof, similar to a U-shape resting on (or movable into contact with) the stops 316.

Figure 3C:
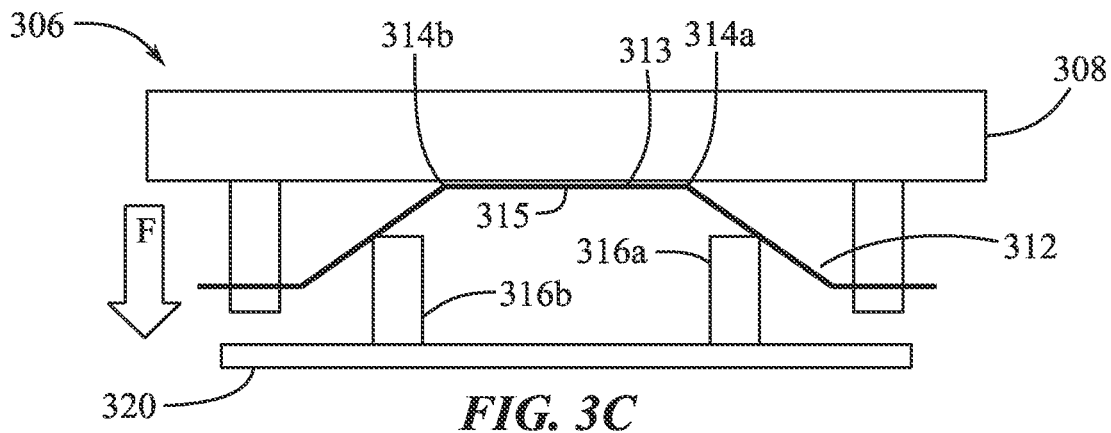
FIG. 3C shows a side view of the button mechanism of FIG. 3A in a depressed state.

As illustrated in FIG. 3C, the collapse or deformation of the step 314a can cause the step 314b to also collapse and invert its curvature, in which case the entire dome 312 can transition to a fully collapsed or inverted state. For example, collapse of the step 314a can cause collapse of step 314b due to bending in the center of the dome 312, which in turn pulls on the undepressed side of the keycap 308 (e.g., generates a downward force drawing down the other side of the keycap 308), which then fully depresses the keycap 308 and produces a parallel motion or stabilizing motion of the keycap 308. Thus, the dome 312 acts as a motion stabilizer to distribute forces throughout the keycap 308 and provide uniform motion. In other words, both sides of the keycap 308 move downward even when only one side of the keycap 308 is pressed, and the keycap remains substantially parallel to the substrate 320 (i.e., has a top surface that remains substantially perpendicular to a horizontal direction), even though the keycap 308 may at least temporarily tilt while it is partially depressed.

In contrast, traditional button mechanisms generally require a separate stabilizing element to prevent tilting of the keycap in response to an off-center push. Advantageously, the dome 312 and stops 316 of the button mechanism 306 can reduce or eliminate the need for a separate stabilizing component for the keycap 308, especially in cases where the dome 312 extends across the entire width of the keycap 308 and when the keycap 308 is square. By designing the dome with a specific geometry and positioning the dome adjacent the stop 316, the dome 312 is able to transfer a force of a tilted keycap 308 to an opposing end of the keycap 308.

After collapse, upward movement of the center of the dome 312 can be limited or constrained by contact with the bottom surface of the keycap 308, as shown in FIG. 3C. In other words, the dome 312 can come into contact with the bottom surface of the keycap 308. In some examples, the dome 312 provides a tactile feedback in response to being pressed. The collapse of the dome (e.g., via the inverting of the steps 314) can produce a "click" type vibration pulse feeling and/or sound. In some examples, the haptic feedback is produced by the dome 312 hitting a bottom of the keycap 308 as the dome 312 collapses. In some examples, the steps 314 produce the haptic feedback. Even upon full collapse, the dome 312 can be biased toward its original state. Thus, once the force (e.g. a user's finger) is removed the dome 312 reverts to its original shape, thereby moving the keycap 308 to the undepressed position shown in FIG. 3A.

In some examples, the dome 312 is bi-stable, with one stable position being when the first surface 313 is concave (as shown in FIG. 3A), and the dome transitions to another stable (or semi-stable) position being when the first surface 313 is convex (as shown in FIG. 3C). In some embodiments, the button mechanism 306 can include an additional return mechanism to return the keycap 308 to the undepressed position.

Any of the features, components, and/or parts, including the arrangements and configurations thereof shown in FIGS. 3A-3C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A-3C.

Figure 4:
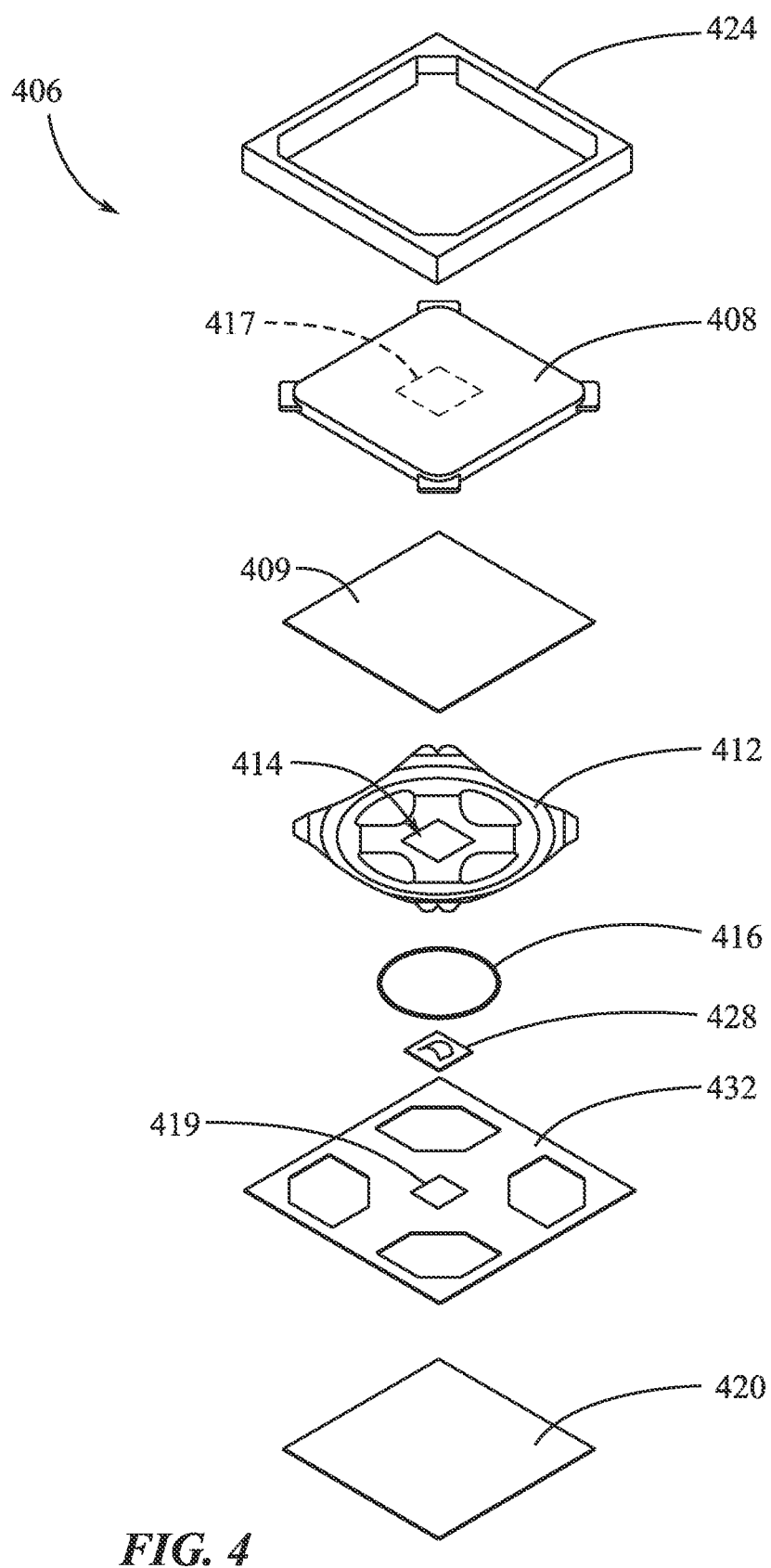
FIG. 4 shows a perspective exploded view of a button mechanism.

FIG. 4 shows a perspective exploded view of a button mechanism 406. The button mechanism 406 can be substantially similar to, and can include some or all of the features of, the button mechanisms described herein, such as button mechanisms 106, 206, and 306. The button mechanism 406 can include a frame 424, a keycap 408, a film 409, a dome 412, a stop 416, an electrical contact 428, a membrane 432, and a baseplate 420.

In some examples, the button mechanism includes a film 409 that is positioned adjacent or molded onto the dome 412. The film 409 may be a substantially compliant material, such as a silicone or other elastomeric material. The film 409 can act as a sound dampener to dampen the sound of the dome 412 as it collapses. Thus, the film 409 can be referred to as a sound dampening layer. The film 409 may be formed from or include a flexible material. The flexibility of the film 409 may accommodate movement or deformation of the dome 412 when the keycap 408 is depressed. In some examples, the film 409 may be attached or affixed to the dome 412 around an outer edge or perimeter of the film 409, which may also contribute to the ability of the film 409 to accommodate movement or deformation in response to a force from a keycap or other actuation member. In some examples, the film 409 can substantially seal a gap between a perimeter of the keycap 408 and the frame 424. In some embodiments, the film 409 can be formed with or attached to a bottom surface of the keycap 408.

When an actuation force is applied to the keycap 408, the keycap 408 (or a component thereof) may deform or deflect in such a way that an electrical or conductive connection is formed, thus allowing an input to be detected. As illustrated, the dome 412 can include a hole 414 or aperture positioned in a center of the dome 412. In some examples, the hole 414 accommodates the passage of the electrical contact 428 through the hole 414. In some examples, the electrical contact 428 is attached to the membrane 432. Upon depressing the keycap 408, the electrical contact 428 passes through the hole 414 to contact the keycap or a conductive component (e.g., 417) attached to or integrated with an underside of the keycap 408. In some examples, the membrane 432 may include an electrical terminal 419. The electrical terminal may be molded in or otherwise integrated with the membrane 432. For example, a metal terminal 419 may be placed into a mold, and then material forming the membrane 432 may be introduced into the mold, at least partially encapsulating the metal terminal(s) 419 in the membrane 432.

One or more electrical terminals 419 may have exposed portions on the membrane 432. The exposed portion of the terminal 419 may be positioned so that the electrical contact 428 contacts the exposed portion of the terminal 419 when the dome 412 is collapsed due to actuation of the keycap 408. This in turn forms an electrical path between the electrical contact 428 and the terminal 419 in the membrane 432.

In order to ensure proper functioning of the button mechanism 406, the size/location of the stop 416 can be based on the size and shape of the dome 412. In some examples, the more curved the dome 412 (i.e., if the dome has a relatively small radius of concave top surface curvature), the smaller the diameter of the stop 416 needs to be in order to buckle the dome 412 in response to a force. Likewise, when the dome 412 is less curved (i.e., a larger radius of concave top surface curvature), the stop 416 may have a larger diameter. The size/position of the stop 416 can be based on the location of the steps or reliefs (e.g., steps 314) in the dome 412. For example, the stop 416 can be designed to be disposed directly beneath the steps in the dome 412. In some embodiments, the stop 416 can be configured to engage the dome at a position radially internal to a step (e.g., 314) of the dome 412. Furthermore, the dome 412 can have a substantially square shape with four corners. The corners can extend from and be spaced around a central circular, cylindrical, or spherical portion, and the step features (e.g., 314) can transition between the square and circular perimeters.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5A:
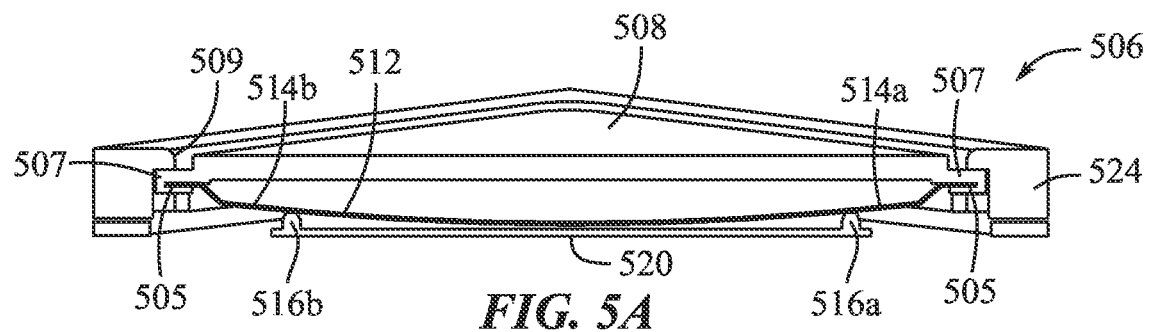
FIG. 5A shows a side view of a button mechanism in an undepressed state, as taken through section lines 5-5 in FIG. 1.
Figure 5B:
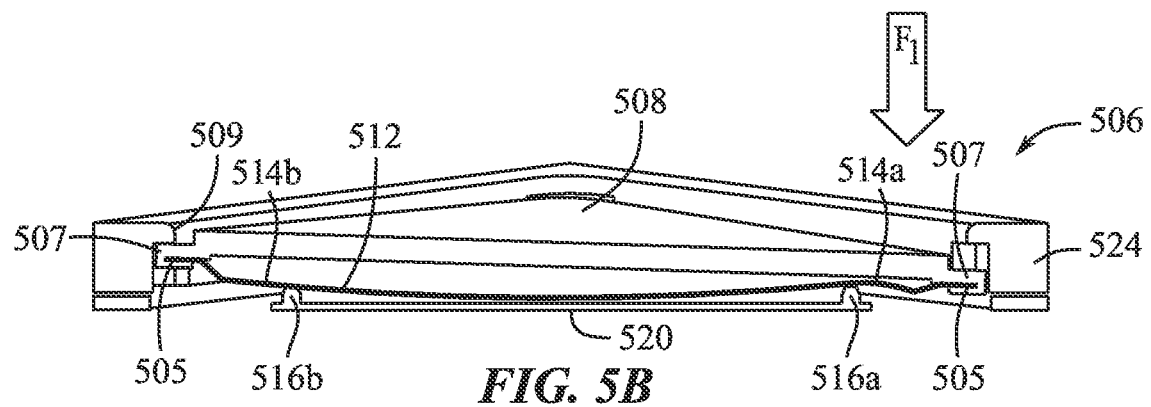
FIG. 5B shows a side view of the button mechanism of FIG. 5A in a partially depressed state.
Figure 5C:
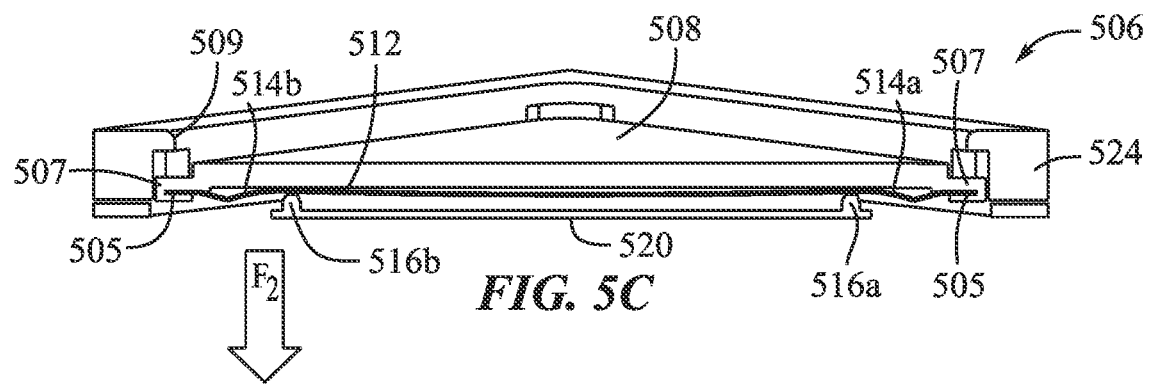
FIG. 5C shows a side view of the button mechanism of FIG. 5A in a depressed state.

FIGS. 5A-5C show perspective side cross-sections of the progression of a button mechanism 506 as it is depressed. FIGS. 5A-5C are viewed along section line 5-5 of FIG. 1. FIG. 5A shows a side cross-sectional view of a button mechanism 506 in an undepressed or rest state. It will be understood that for simplicity only select component or features of the button mechanism 506 are shown in FIG. 5A. The depiction of FIG. 5A is not intended to be exhaustive. The button mechanism 506 can be substantially similar to, including some or all of the features of, the button mechanisms described herein, such as button mechanisms 106, 206, 306, and 406.

The button mechanism 506 can include a frame 524, a keycap 508, a dome 512, stops 516a, 516b (collectively stops 516), and a substrate 520. The dome 512 can include a upper surface and a lower surface (as oriented in FIG. 5A). The upper surface and the lower surface can be major surfaces of the dome 512 and can be opposite one another. The button mechanism 506 can include one or more stops 516. In some examples, the stops 516 include opposite ends of a ring, such as illustrated in FIG. 4. The stops 516 can be separate, distinct components from the substrate 520, or can be a unitary component with the substrate 520. In other words, the stops 516 can extend from the substrate 520.

As shown in FIG. 5A, in an undepressed state, the dome 512 can be curved such that the upper surface of the dome 512 is primarily concave, and the lower surface of the dome 512 is primarily convex. In some examples, the lower surface of the dome 512 directly contacts or touches the stop 516. In some examples, dome 512 and keycap 508 is supported, partially or entirely, at the interface between the dome 512 and the stop 516.

The dome 512 can include one or more bend regions 514a, 514b (collectively referred to as bend regions 514). The bend regions 514 can be portions of the dome 512 that have a maximum bend or curvature when a force, such as force $F_1$, is applied. For example, the bend region 514a can be the first portions of the dome to bend, collapse, invert, or deflect in response to the force $F_1$. In response to the deflection at bend region 514a, the bend region 514b can invert or bend to generate a pull force $F_2$ on the keycap 508 (see FIG. 5C). The bend regions 514 can be implemented as steps, breaks, joints, elbows, reliefs, or any other feature that collapses, bends, snaps or otherwise pivots to invert a region of the dome 512 (e.g., as shown in FIG. 5B). In some examples, the bend regions 514 can be specifically designed to have a lower strength or stability threshold such that the location of the bend regions 514 are the first to deform in response to a force on the keycap 508.

FIG. 5B shows a side view of the button mechanism 506 in a tilted or partially depressed state. The tilt shown in FIG. 5B can be caused by a force $F_1$ applied to an edge or corner of the keycap 508. As the force $F_1$ is applied, the dome 512 presses against the stop 516a, causing the bend region 514a to buckle. In response to the off-center force $F_1$, the dome 512 can partially deform or deflect. As illustrated, the dome 512 can deform such that a portion of the dome inverts while a different portion of the dome 512 is momentarily not inverted. In other words, in response to the force $F_1$ being applied to an edge or corner of the keycap 508, a portion of the upper surface bends to be convex. Thus, in a partially depressed state, the upper surface of the dome 512 can be partially concave (as shown on the left) and partially convex (as shown on the right).

As illustrated in FIG. 5C, the collapse or deformation of the bend region 514a can cause the entire dome 512 to collapse or invert. For example, collapse of the bend region 514a can cause collapse of the bend region 514b, which in turn pulls or generates a force $F_2$ on the undepressed side of the keycap 508 which fully depressed the keycap 508. Thus, the dome 512 acts as a motion stabilizer to distribute forces throughout the keycap and provide uniform motion. In contrast, traditional button mechanisms require a separate stabilizing element to prevent tilting of the keycap in response to off-center pushed. Advantageously, the dome 512 and stops 516 of the button mechanism 506 remove the need for a separate stabilizing component. Other features and characteristics of dome 312 described in connection with FIGS. 3A-3C can be applied to dome 512 and the rest of mechanism 506.

As shown in FIGS. 5A-5C, the dome 512 may include ends 505, such as a corner or flange connected to a portion of the keycap 508. In some examples, the dome 512 may be positioned within and/or coupled to recesses 507 formed in a corner, wall, or edge of the keycap 508. The recess 507 may extend only partially into the keycap 508. The keycap 508 may define a surface of a cavity into which the ends 505 of the dome 512 extend. Typically, although not necessarily, multiple ends 505 project from a single dome to couple or attach to multiple recesses 507 in the keycap 508. The button mechanism 506 can include additional features for securing the dome 512 to the keycap 508. For example, the keycap 508 and/or the dome 512 can include one or more features such as barbs or protrusions, adhesive positioned within the recesses, compression or friction fit surfaces or features, and/or other features that secure the corners of the dome within the recesses 507. In some examples, the dome 512 is heat staked to the keycap 508.

In some examples, the frame 524 can include a lip 509. The lip 509 can extend inward form the frame 524 and can be designed to contact a portion of the keycap 508, such as a flange extending from the corners of the keycap 508, to prevent or limit upward movement of the keycap 508 beyond the lip 509. Thus, the lip 509 can at least partially constrain the keycap 508. The frame 524 can include sidewalls that further constrain or limit movement of the keycap 508 to the vertical direction (as oriented in FIGS. 5A-5C).

Any of the features, components, and/or parts, including the arrangements and configurations thereof shown in FIGS. 5A-5C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A-5C.

Figure 6:
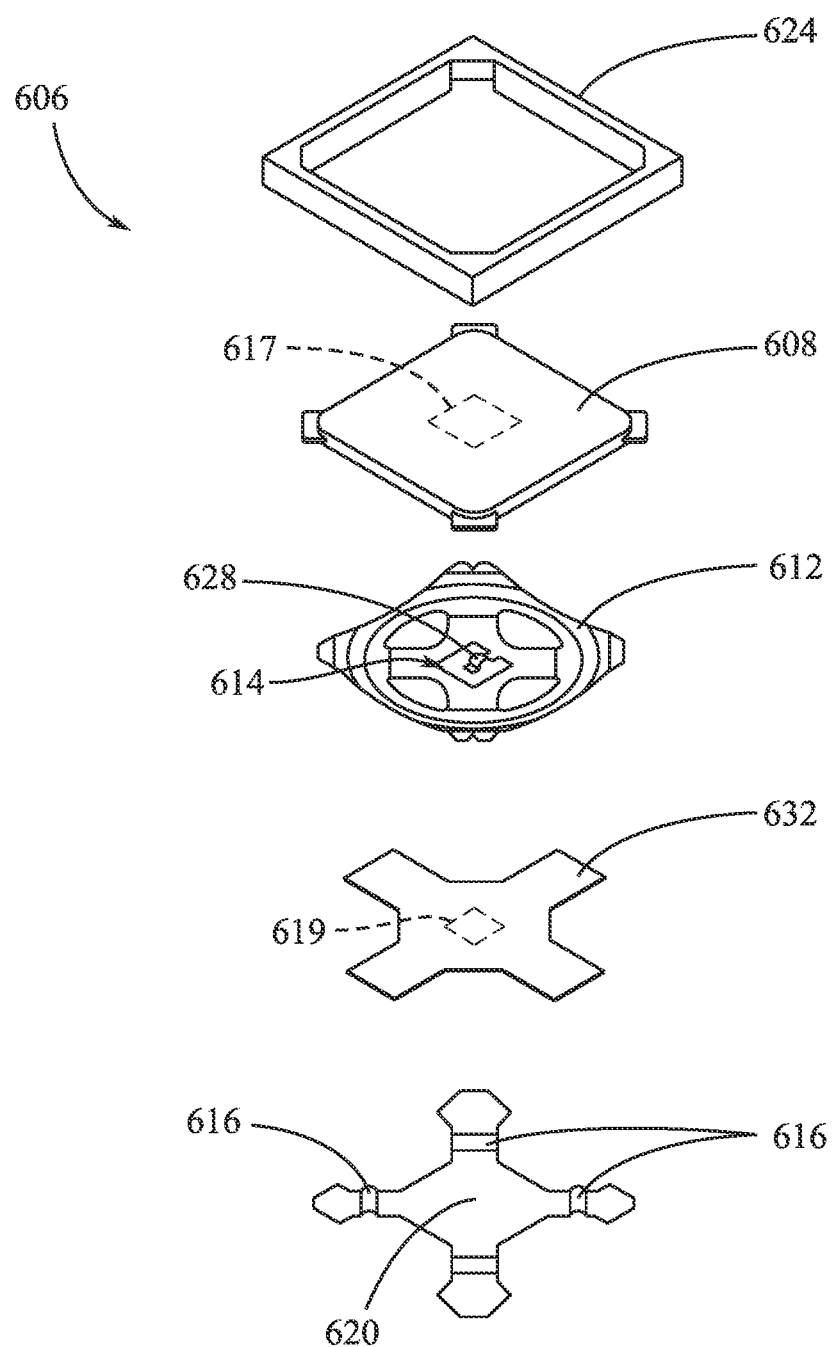
FIG. 6 shows a perspective exploded view of a button mechanism.

FIG. 6 shows a perspective exploded view of a button mechanism 606. The button mechanism 606 can be substantially similar to, and can include some or all of the features of, the button mechanisms described herein, such as button mechanisms 106, 206, 306, 406, and 506. The button mechanism 606 can include a frame 624, a keycap 608, a film 609, a dome 612, a stop 616, an electrical contact 628, a membrane 632, and a baseplate 620.

When the actuation force is applied to the keycap 608, the keycap 608 (or a component thereof) may deform or deflect in such a way that an electrical or conductive connection is formed, thus allowing an input to be detected. In some examples, the dome 612 can include a tongue or electrical contact 628. The electrical contact 628 can be integrally formed from the dome 612. For example, the contact 628 can be a piece of the dome 612 that extends into a hole 614 in the center of the dome 612. The contact 628 can be configured to establish an electrical path or communication with an electrical component 617, 619 of the button mechanism 606 in response to the dome 612 collapsing.

An electrical terminal 619 may have exposed portions on the membrane 632. The exposed portion of the terminal 619 may be positioned so that the electrical contact 628 contacts the exposed portion of the terminal when the dome 612 is collapsed due to actuation of the keycap 608. This in turn forms an electrical path between the electrical contact 628 and the terminal 619 in the membrane 632.

In some examples, the stops 616 can be ridges or bumps formed in the baseplate 620. For example, the baseplate can include arms extending from a center of the baseplate 620. The arms can correspond to corners of the dome 612. The arms can include ridges 616 that rise upward toward the dome 612 such that when the dome 612 is depressed it contacts or presses against the ridges 616, thereby causing the dome 612 to collapse. It will be understood that in order to collapse, the dome 612 need only be pressed against one of the ridges 616. Indeed, when only a corner of the keycap 608 is pressed, the dome 612 may only come into contact with one of the ridges 616 before collapsing. In this manner, the ridge or stop 616 that causes the dome 612 to collapse is offset from a center of the button mechanism 606.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

The button mechanisms described herein are capable of reduced the thickness or z-height of the assembly stack up. The total thickness of the button mechanism can be about 2.35 mm. The stop or pusher can have a height of about 0.35 mm. The keycap can have a thickness of about 0.8 mm. The dome can have a thickness of about 0.05 mm. The membrane can have a thickness of about 0.25 mm. The baseplate can have a thickness of about 0.15 mm. The button mechanism can have a clearance between the keycap and the baseplate of about 1.05 mm. The button mechanisms described herein are capable of producing a peak force of about 60 gf, a bottom force of about 7.5 gf, a peak stroke of about 0.2 mm to about 0.25 mm, a bottom stroke of about 0.55 mm to about 0.6 mm, a stroke of about 0.75 mm, and a click ration of about 75%.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computing device comprising:
a housing defining an opening;
a base layer; and
a button mechanism positioned in the opening, the button mechanism comprising:
  a keycap movable relative to the base layer between an undepressed state and a depressed state; and
  a dome contacting the keycap, the dome comprising a first surface and a second surface, opposite the first surface;
wherein:
  in the undepressed state, the first surface is concave and the second surface is convex;
  in a partially depressed state, a first portion of the first surface is convex and a second portion of the first surface is concave; and
  in the depressed state, the first portion and the second portion of the first surface are convex and the second surface is concave.

2. The computing device of claim 1, further comprising a protrusion, the dome pressable into the protrusion as the keycap moves between the undepressed state and the depressed state.

3. The computing device of claim 2, wherein the protrusion defines a torus shape.

4. The computing device of claim 1, wherein the dome comprises a metal material.

5. The computing device of claim 1, wherein the dome is biased to be concave at the first surface.

6. The computing device of claim 1, wherein the dome is collapsible in response to a rotation of the dome.

7. The computing device of claim 1, wherein in the partially depressed state, the keycap is tilted.

8. The computing device of claim 1, wherein the dome comprises a set of corners, wherein the computing device further comprises a ridge positioned beneath each corner of the set of corners of the dome.

9. The computing device of claim 1, wherein the dome is configured to transfer a force from a first end of the keycap to a second end of the keycap, the second end being opposite the first end.

10. The computing device of claim 1, wherein the dome comprises a step configured to buckle to collapse the dome.

11. A key comprising:
   an input member operative to move from a first position to a second position;
   a collapsible stabilizer supporting the input member; and
   a baseplate supporting the collapsible stabilizer, the baseplate defining a ridge;
   wherein, in response to an off-center portion of the collapsible stabilizer being pressed against the ridge, the collapsible stabilizer inverts.

12. The key of claim 11, wherein the baseplate comprises multiple ridges, each ridge corresponding to a corner of the input member.

13. The key of claim 11, wherein the collapsible stabilizer provides tactile feedback in response to collapsing.

14. The key of claim 11, wherein the collapsible stabilizer equalizes a motion of the input member.

15. The key of claim 11, further comprising a sound dampening layer.

16. A key mechanism comprising:
   a keycap movable between a first position to a second position;
   a spring comprising a first end and a second end, the second end being opposite the first end, the first end and the second end being biased in a first direction; and
   a fulcrum engageable with the spring, the fulcrum being offset from a center of the spring;
   wherein in response to the first end pivoting about the fulcrum, the second end is biased in a second direction, the second direction being opposite the first direction.

17. The key mechanism of claim 16, wherein the spring is attached to the keycap.

18. The key mechanism of claim 16, wherein, in response to movement of the first end of the spring in the second direction, the spring pulls the second end of the keycap in the second direction.

19. The key mechanism of claim 16, further defining an electrical contact movable through an aperture defined by the spring.

20. The key mechanism of claim 16, wherein the spring is bi-stable.

* * * * *